United States Patent
Xu et al.

(10) Patent No.: US 12,281,693 B2
(45) Date of Patent: Apr. 22, 2025

(54) LINEAR ACTUATOR CONVENIENT TO OPERATE

(71) Applicant: ZHEJIANG JIECANG LINEAR MOTION TECHNOLOGY CO., LTD., Zhejiang (CN)

(72) Inventors: Xin Xu, Zhejiang (CN); Xinxing Zhao, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/747,472

(22) Filed: Jun. 19, 2024

(65) Prior Publication Data

US 2024/0337310 A1    Oct. 10, 2024

Related U.S. Application Data

(63) Continuation of application No. 17/781,049, filed as application No. PCT/CN2021/088238 on Apr. 20, 2021, now Pat. No. 12,049,945.

(30) Foreign Application Priority Data

Apr. 29, 2020  (CN) .......................... 202010356776.2

(51) Int. Cl.
*F16H 25/24*    (2006.01)
*F16H 25/20*    (2006.01)

(52) U.S. Cl.
CPC . *F16H 25/2454* (2013.01); *F16H 2025/2071* (2013.01); *F16H 2025/2084* (2013.01); *F16H 2025/209* (2013.01); *F16H 2025/2463* (2013.01)

(58) Field of Classification Search
CPC ......... F16H 2025/2071; F16H 25/2454; F16H 2025/2463; F16H 25/2015; F16H 25/2021; F16H 25/2025; F16H 2025/2068
See application file for complete search history.

(56) References Cited

U.S. PATENT DOCUMENTS 3,074,659 A    1/1963  Furst
6,158,295 A *  12/2000 Nielsen ............... F16H 25/2454
                                                 192/223.4

(Continued)

FOREIGN PATENT DOCUMENTS

CN    206054568    3/2017
CN    108591403    9/2018

(Continued)

OTHER PUBLICATIONS

"International Search Report (Form PCT/ISA/210) of PCT/CN2021/088238", mailed on Jul. 9, 2021, with English translation thereof, pp. 1-4.

(Continued)

*Primary Examiner* — Gregory Robert Weber
(74) *Attorney, Agent, or Firm* — JCIPRNET

(57) ABSTRACT

Disclosed is a linear actuator, including a drive motor, a transmission assembly, a rotary screw, a transmission nut, a clutch device, a self-locking device and a hand-pull release assembly. The clutch device is arranged between the transmission assembly and the rotary screw. The self-locking device is configured to generate frictional resistance to the rotary screw when the rotary screw rotates reversely, and the self-locking device includes a release torsion spring. The hand-pull release assembly includes a first driving member connected with the clutch device and a second driving member connected with the self-locking device, and has an initial state and a fully released state. During the process from the initial state to the fully released state, the first (Continued)

driving member drives the clutch device to disconnect power, and the second driving member drives the release torsion spring to extend.

9 Claims, 6 Drawing Sheets

(56) References Cited

U.S. PATENT DOCUMENTS

| | | | |
|---|---|---|---|
| 9,074,659 | B2 | 7/2015 | Wu |
| 2014/0260730 | A1 | 9/2014 | Wu |
| 2018/0238426 | A1 | 8/2018 | Hung |

FOREIGN PATENT DOCUMENTS

| | | |
|---|---|---|
| CN | 209130121 | 7/2019 |
| CN | 110103785 | 8/2019 |
| CN | 209638358 | 11/2019 |
| CN | 111577850 | 8/2020 |
| CN | 111600432 | 8/2020 |
| CN | 212407484 | 1/2021 |
| DE | 202018100747 | 4/2018 |
| DE | 102019116529 | 1/2020 |
| WO | 9830816 | 7/1998 |

OTHER PUBLICATIONS

"Search Report of Europe Counterpart Application", issued on Apr. 24, 2023, pp. 1-8.
"Office Action of China Counterpart Application", issued on May 18, 2024, with English translation thereof, p. 1-p. 14.
"Office Action of Europe Counterpart Application", issued on May 8, 2024, p. 1-p. 6.

* cited by examiner

LINEAR ACTUATOR CONVENIENT TO OPERATE

CROSS-REFERENCE TO RELATED APPLICATION

The present application is a continuation of and claims the priority of U.S. application Ser. No. 17/781,049, filed on May 31, 2022, now pending. The prior U.S. application Ser. No. 17/781,049 is a 371 of international application of PCT application No. PCT/CN2021/088238, filed on Apr. 20, 2021, which claims the priority benefit of China application No. 202010356776.2 filed on Apr. 29, 2020. The entirety of each of the above-mentioned patent applications is incorporated herein by reference and made a part of this specification.

TECHNICAL FIELD

The present disclosure relates to a linear actuator convenient to operate, and belongs to the technical field of linear transmission.

BACKGROUND

Linear actuators, also known as electric push rods, are widely used in furniture, medical equipment, solar power generation and other fields. A linear actuator mainly includes a drive motor, a transmission worm, a worm wheel, a screw, and a nut. A work principle is that the drive motor drives the transmission worm to rotate, the transmission worm meshes with the worm wheel to drive the worm wheel to rotate, the worm wheel rotates to drive the screw to rotate, the screw rotates to drive the nut to move axially, and the nut is generally connected with an inner tube, thereby realizing a telescopic movement of the inner tube.

In combination with an application environment of the linear actuator, the linear actuator will be added with a clutch device in failure of the drive motor, power failure or other situations where power needs to be disconnected. The clutch device is mainly configured to disconnect the power between the drive motor and the rotary screw, so that reverse push may be achieved by manually driving the rotary screw to rotate. For example, CN201621013870.3 discloses a solution for adding a clutch device into a linear actuator.

In addition, to make the linear actuator generate resistance during the retraction, a self-locking device is generally arranged on the linear actuator. This type of self-locking device usually includes a friction sleeve and a self-locking torsion spring sleeved outside the friction sleeve. When the friction sleeve rotates reversely with the rotary screw, the self-locking torsion spring will retract radially to hold the friction sleeve tightly, thereby generating self-locking resistance to the rotary screw. This type of self-locking device has been widely used in linear actuators.

However, an existing linear actuator is usually only provided with the clutch device or the self-locking device. Even if the clutch device and the self-locking device are provided at the same time, drive assemblies that drive the two devices are usually separated from each other. That is, when needing to control the clutch device and the self-locking device at the same time, an operator needs to operate the two devices independently, so operation is more complicated.

SUMMARY

To overcome the defects in the prior art, the present disclosure provides a linear actuator convenient to operate. A hand-pull release assembly is capable of controlling two devices, thereby making operation more convenient.

To solve the technical problem, the present disclosure adopts the following technical solution:

A linear actuator convenient to operate, including a drive motor, a transmission assembly, a rotary screw and a transmission nut, wherein the drive motor drives the rotary screw to rotate by the transmission assembly, and the rotary screw rotates to drive the transmission nut to move axially along the rotary screw; and the linear actuator further includes:

a clutch device, arranged between the transmission assembly and the rotary screw, and configured to connect or disconnect the power between the transmission assembly and the rotary screw;

a self-locking device, configured to generate frictional resistance to the rotary screw when the rotary screw rotates reversely, and including a release torsion spring configured to unlock the self-locking device; and a hand-pull release assembly, including a first driving member connected with the clutch device and a second driving member connected with the self-locking device, and having an initial state and a fully released state, wherein during the process from the initial state to the fully released state, the first driving member drives the clutch device to disconnect the power, and the second driving member drives the release torsion spring to extend.

The present disclosure has the following beneficial effects:

Firstly, the linear actuator provided by the present disclosure is provided with the clutch device and the self-locking device, so that the linear actuator is more comprehensive in function. Moreover, a combination of the clutch device and the self-locking device also has an advantage. After the clutch device disconnects the power, the rotary screw is almost completely free to rotate, easily causing the linear actuator to retract too fast. Therefore, the self-locking device is arranged to provide certain resistance so as to prevent the retraction from being too fast.

Secondly, the self-locking device in the present disclosure is also provided with the release torsion spring, that is, the self-locking device may also be unlocked. When the release torsion spring is extended, the self-locking device is unlocked. At this time, the self-locking device hardly generates resistance whether the linear actuator rotates forwards or reversely, which may enable the linear actuator to be quickly released, that is, it may quickly retract.

Finally, the linear actuator provided by the present disclosure is provided with the hand-pull release assembly that includes the first driving member and the second driving member. The first driving member and the second driving member are respectively configured to drive the clutch device and the self-locking device. When the linear actuator needs to be released quickly, the operator operates the hand-pull release assembly to make it in the fully released state, the clutch device is enabled to be in a disconnection state, and the self-locking device is unlocked. A user may control the two devices by only operating the hand-pull release assembly, so the operation is very convenient.

Preferably, the transmission assembly includes a transmission worm and a transmission worm wheel, the transmission worm is connected with the drive motor, the transmission worm wheel is sleeved outside the rotary screw, and the clutch device is arranged between the transmission worm wheel and the rotary screw.

Preferably, the clutch device includes a coupling gear sleeve, the transmission worm wheel is provided with a gear slot matching for transmission with the coupling gear sleeve, and the coupling gear sleeve is sleeved on the rotary screw and is axially movable relative to the rotary screw.

Preferably, the clutch device further includes a return spring that generates an axial reset force to the coupling gear sleeve.

Preferably, the linear actuator further includes a shell, the first driving member includes a swing rod rotatably installed on the shell, the hand-pull release assembly further includes a pull rod arranged to be axially movable relative to the rotary screw, the swing rod is connected with the pull rod, and when the pull rod is pulled, the swing rod swings to push the clutch device axially.

Preferably, the self-locking device includes a first friction sleeve and a second friction sleeve that are respectively sleeved on the rotary screw and have axial end surfaces contacting each other, the first friction sleeve rotates synchronously with the rotary screw, the second friction sleeve freely rotates relative to the rotary screw, the first friction sleeve is sleeved with a self-locking torsion spring, and the release torsion spring is sleeved on the second friction sleeve; or, the self-locking device includes a third friction sleeve that rotates synchronously with the rotary screw, and the release torsion spring is sleeved on the third friction sleeve.

Preferably, the second driving member includes a push block that is provided with a guide surface, the release torsion spring includes a pin that extends radially, the hand-pull release assembly includes the pull rod arranged to be axially movable relative to the rotary screw, the pull rod is connected with the push block, and when the pull rod is pulled, the guide surface on the push block is in contact with the pin, thereby making the release torsion spring extend outwards.

Preferably, during the process from the fully released state to the initial state of the hand-pull release assembly, the second driving member is first disengaged from the release torsion spring on the self-locking device to generate a self-locking force, and the first driving member is correspondingly disengaged from the clutch device after the release torsion spring is returned.

Preferably, the linear actuator further includes an outer tube and an inner tube that is telescopic relative to the outer tube, an end of the inner tube is connected with a front pull head, and a hand-screw release device is connected between the front pull head and the end of the inner tube.

Preferably, the hand-screw release device includes a knob cover, a connection cover seat and the hand-screw release torsion spring, the connection cover seat is fixedly connected with the inner tube, the front pull head is sleeved with the connection cover seat, the hand-screw release torsion spring is arranged between the connection cover seat and the front pull head, and the knob cover is configured to poke the hand-screw release torsion spring to radially retract or radially extend outwards.

These features and advantages of the present disclosure will be disclosed in detail in the following specific embodiments and accompanying drawings.

BRIEF DESCRIPTION OF THE DRAWINGS

The present disclosure is further described below with reference to the accompanying drawings.

DESCRIPTION OF THE EMBODIMENTS

Figure 1:
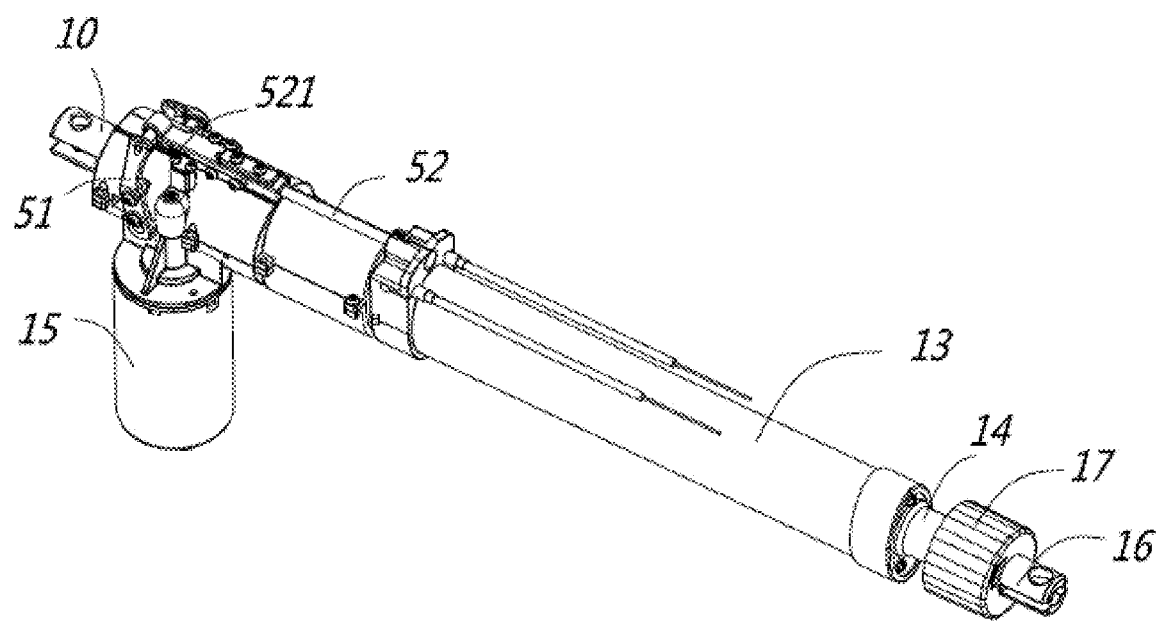
FIG. 1 is a first overall schematic diagram of a linear actuator according to an embodiment 1 of the present disclosure.

The technical solution in the embodiments of the present disclosure is explained and described below with reference to the accompanying drawings of the embodiments of the present disclosure, but the following embodiments are merely the preferred embodiments of the present disclosure, rather than all. All other embodiments obtained by those of ordinary skill in the art based on the embodiments of the present disclosure without creative efforts shall fall within the scope of protection of the present disclosure.

In the following description, the orientations or positional relationships indicated by the terms such as "inner", "outer", "upper", "lower", "left", "right", etc. are based on the orientations or positional relationships shown in the accompanying drawings, which are only for the convenience of describing the embodiments and simplifying the description, rather than indicating or implying that the referred device or element must have a particular orientation and is constructed and operated in the particular orientation. Therefore, they should not be understood as a limitation of the present disclosure.

Embodiment 1

As shown in FIG. 1 to FIG. 7, this embodiment provides a linear actuator. The linear actuator is also commonly called a linear drive or an electric push rod. The linear actuator includes a shell, an outer tube 13, an inner tube 14, a drive motor 15, a transmission assembly, a rotary screw 20 and a transmission nut 21. The drive motor 15 drives the rotary screw 20 to rotate by the transmission assembly, and the rotary screw 20 rotates to drive the transmission nut 21 to move axially along the rotary screw 20. The transmission nut 21 is fixedly connected with the inner tube 14. When the transmission nut 21 moves axially, it drives the inner tube 14 to move axially relative to the outer tube 13 and the shell. An outer end of the inner tube 14 is connected to an object to be driven. The linear actuator in this embodiment further includes:
- a clutch device, arranged between the transmission assembly and the rotary screw 20, and configured to connect or disconnect the power between the transmission assembly and the rotary screw 20;
- a self-locking device, configured to generate frictional resistance to the rotary screw 20 when the rotary screw 20 rotates reversely, and including a release torsion spring 40 configured to unlock the self-locking device; and
- a hand-pull release assembly, including a first driving member connected with the clutch device and a second driving member connected with the self-locking device, and having an initial state and a fully released state, wherein during the process from the initial state to the fully released state, the first driving member drives the clutch device to disconnect the power, and the second driving member drives the release torsion spring 40 to extend.

Firstly, the linear actuator provided by this embodiment is provided with the clutch device and the self-locking device, so that the linear actuator is more comprehensive in function. Moreover, a combination of the clutch device and the self-locking device also has an advantage. After the clutch device disconnects the power, the rotary screw 20 is almost completely free to rotate, easily causing the linear actuator to retract too fast. Therefore, the self-locking device is arranged to provide certain resistance to prevent the rotary screw 20 from rotating too fast, so as to prevent the transmission nut 21 from retracting too fast.

Secondly, the self-locking device in this embodiment is also provided with the release torsion spring 40, that is, the self-locking device may also be unlocked. When the release torsion spring 40 is extended, the self-locking device is unlocked. At this time, the self-locking device hardly generates resistance to the rotary screw 20 whether the linear actuator rotates forwards or reversely, which may enable the linear actuator to be quickly released, that is, it may quickly retract.

Finally, the linear actuator provided by this embodiment is provided with the hand-pull release assembly that includes the first driving member and the second driving member. The first driving member and the second driving member are respectively configured to drive the clutch device and the self-locking device. When the linear actuator needs to be released quickly, the operator operates the hand-pull release assembly to make it in the fully released state, the clutch device is enabled to be in a disconnection state, and the self-locking device is unlocked. A user may control the two devices by only operating the hand-pull release assembly, so the operation is very convenient.

A specific structure of this embodiment is as follows:

In this embodiment, the transmission assembly includes a transmission worm 151 and a transmission worm wheel 22, the transmission worm 151 is connected to the drive motor 15, the transmission worm wheel 22 is sleeved outside the rotary screw 20 and is coaxial with the rotary screw 20, and the clutch device is arranged between the transmission worm wheel 22 and the rotary screw 20. In this embodiment, the clutch device is mainly configured to disconnect the power between the transmission worm wheel 22 and the rotary screw 20.

Figure 4:
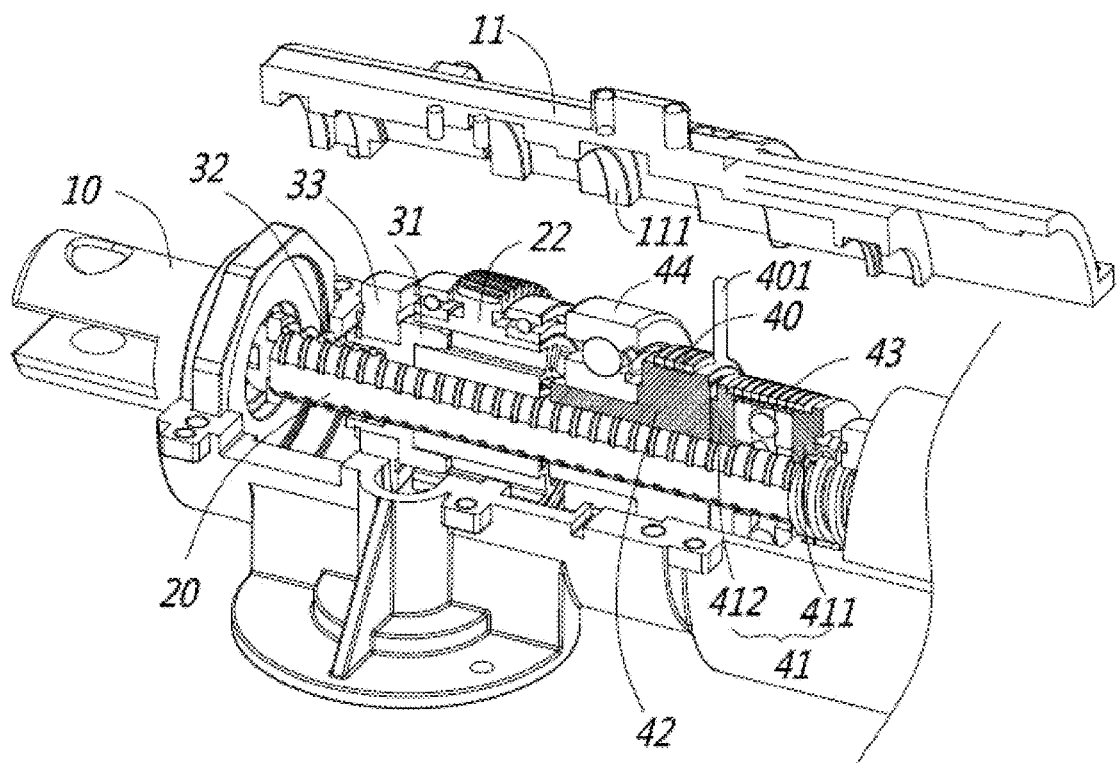
FIG. 4 is a partial enlarged schematic diagram of the linear actuator according to the embodiment 1 of the present disclosure.
Figure 5:
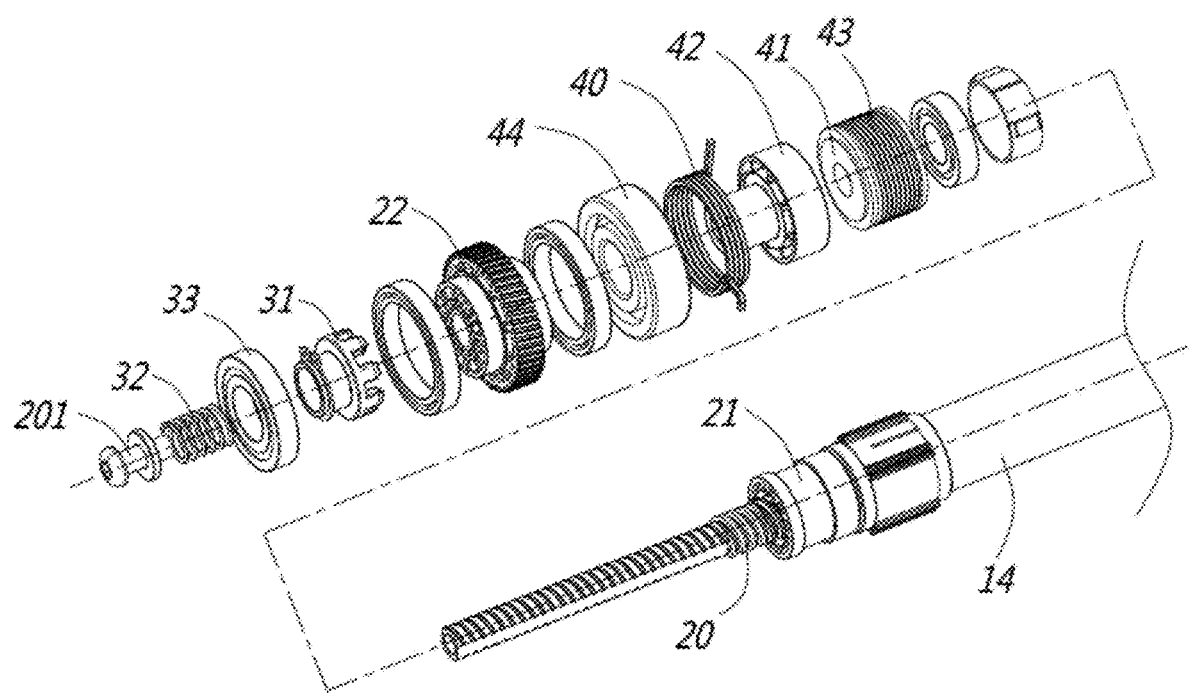
FIG. 5 is an exploded schematic diagram of internal parts in the linear actuator according to the embodiment 1 of the present disclosure.

A specific structure of the clutch device in this embodiment is as follows: the clutch device includes a coupling gear sleeve 31. The coupling gear sleeve 31 is sleeved on the rotary screw 20 by a flat position, that is, the coupling gear sleeve 31 rotates synchronously with the rotary screw 20 in a circumferential direction, but the coupling gear sleeve 31 may move axially along the rotary screw 20 in an axial direction. The coupling gear sleeve 31 has a plurality of toothed parts in the direction of the transmission worm wheel 22. An end surface of the transmission worm wheel 22 is provided with a gear slot matching for transmission with the coupling gear sleeve 31. When the coupling gear sleeve 31 is close to the transmission worm wheel 22, the toothed parts are inserted into the gear slot, and the coupling gear sleeve 31 rotates synchronously with the transmission worm wheel 22. When the coupling gear sleeve 31 is away from the transmission worm wheel 22, the toothed parts are disengaged from the gear slot, and the coupling gear sleeve 31 is separated from the transmission worm wheel 22, that is, the rotary screw 20 will be in a non-power connection state. Referring to FIG. 4, it is a state in which the coupling gear sleeve 31 is inserted into the transmission worm wheel 22.

In this embodiment, the first driving member is mainly configured to poke the coupling gear sleeve 31 to move axially. Meanwhile, to make the clutch device reset after poking by the first driving member, the clutch device in this embodiment further includes a return spring 32 that generates an axial reset force to the coupling gear sleeve 31. An end of the rotary screw 20 is provided with a limit end 201, the return spring 32 is sleeved on the rotary screw 20, and two ends of the return spring are limited between the limit end 201 and the coupling gear sleeve 31.

The linear actuator in this embodiment further includes a shell. The shell includes an upper shell 11 and a lower shell 12. A first bearing 33 is arranged between the coupling gear sleeve 31 and the shell, so as to reduce frictional resistance during the rotation of the coupling gear sleeve 31.

A structure of the first driving member in this embodiment is as follows: the first driving member includes a swing rod 51 rotatably installed on the shell. The hand-pull release assembly further includes a pull rod 52 arranged to be axially movable relative to the rotary screw 20. The swing rod 51 is connected with the pull rod 52. During the specific installation, an upper end of the swing rod 51 is rotatably connected with the pull rod 52, the middle of the swing rod 51 is rotatably connected to the upper shell 11, a lower end of the swing rod 51 is connected with a poke block 53, and the poke block 53 is relatively fixed to the coupling gear sleeve 31. Specifically, in this embodiment, the poke block 53 is connected with the first bearing 33 on the coupling gear sleeve 31. When the pull rod 52 is pulled, the swing rod 51 swings, and the corresponding poke block 53 will push the coupling gear sleeve 31 to move axially.

A structure of the self-locking device in this embodiment is as follows: the self-locking device includes a first friction sleeve 41 and a second friction sleeve 42. The first friction sleeve 41 and the second friction sleeve 42 are respectively sleeved on the rotary screw 20. The first friction sleeve 41 and the rotary screw 20 are positioned by a flat position, that is, in a circumferential direction, the first friction sleeve 41 and the rotary screw 20 rotate synchronously, while the second friction sleeve 42 rotates freely relative to the rotary screw 20, and in an axial direction, axial end surfaces of the first friction sleeve 41 and the second friction sleeve 42 contact each other. Meanwhile, the release torsion spring 40 is sleeved on the second friction sleeve 42. The release torsion spring 40 always holds the second friction sleeve 42 tightly in the initial state. The first friction sleeve 41 is sleeved with a self-locking torsion spring 43.

In this embodiment, the first friction sleeve 41 preferably includes a front shaft sleeve 411 and a rear shaft sleeve 412. The axial middle of the front shaft sleeve 411 and the rear shaft sleeve 412 is abutted by using a thrust bearing. In other embodiments, the first friction sleeve 41 may adopt the form of an integral shaft sleeve.

When the inner tube 14 in the linear actuator extends normally, the driving motor 15 drives the rotary screw 20 to rotate forwards by the clutch device. When the inner tube 14 extends to a predetermined position, the drive motor 15 stops. In this position, when the inner tube 14 tends to retract, the axial end surfaces of the first friction sleeve 41 and the second friction sleeve 42 contact each other. Since the self-locking torsion spring 43 has a holding resistance effect on the first friction sleeve 41 and the second friction sleeve 42 is also held tightly by the release torsion spring 40 in a normal state, after the end surfaces of the first friction sleeve 41 and the second friction sleeve 42 contact each other, frictional resistance is generated therebetween for the rotary screw 20 to prevent the rotary screw from rotating reversely, so as to complete the self-locking force.

When the linear actuator needs to retract normally, the drive motor 15 drives the rotary screw 20 to rotate reversely by the clutch device. At this time, a rotational torque of the rotary screw 20 will overcome the self-locking force provided by the self-locking device, and the rotary screw 20 will continue to rotate reversely, thereby making the transmission nut 21 drive the inner tube 14 to retract.

Figure 2:
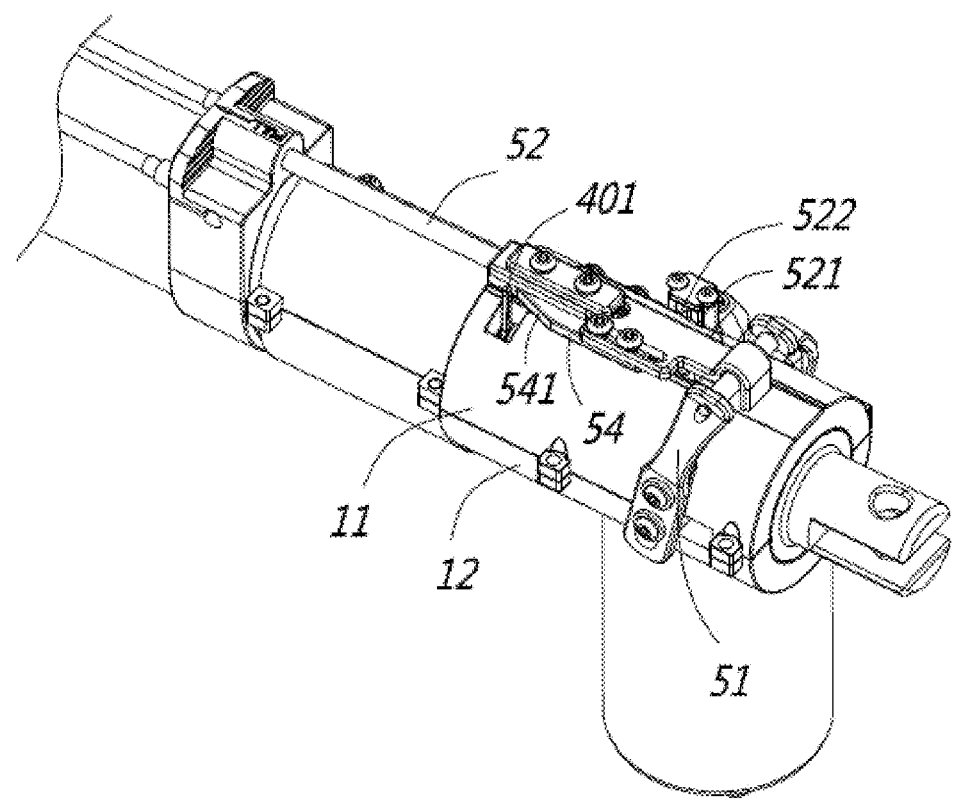
FIG. 2 is a second overall schematic diagram of the linear actuator according to the embodiment 1 of the present disclosure.
Figure 3:
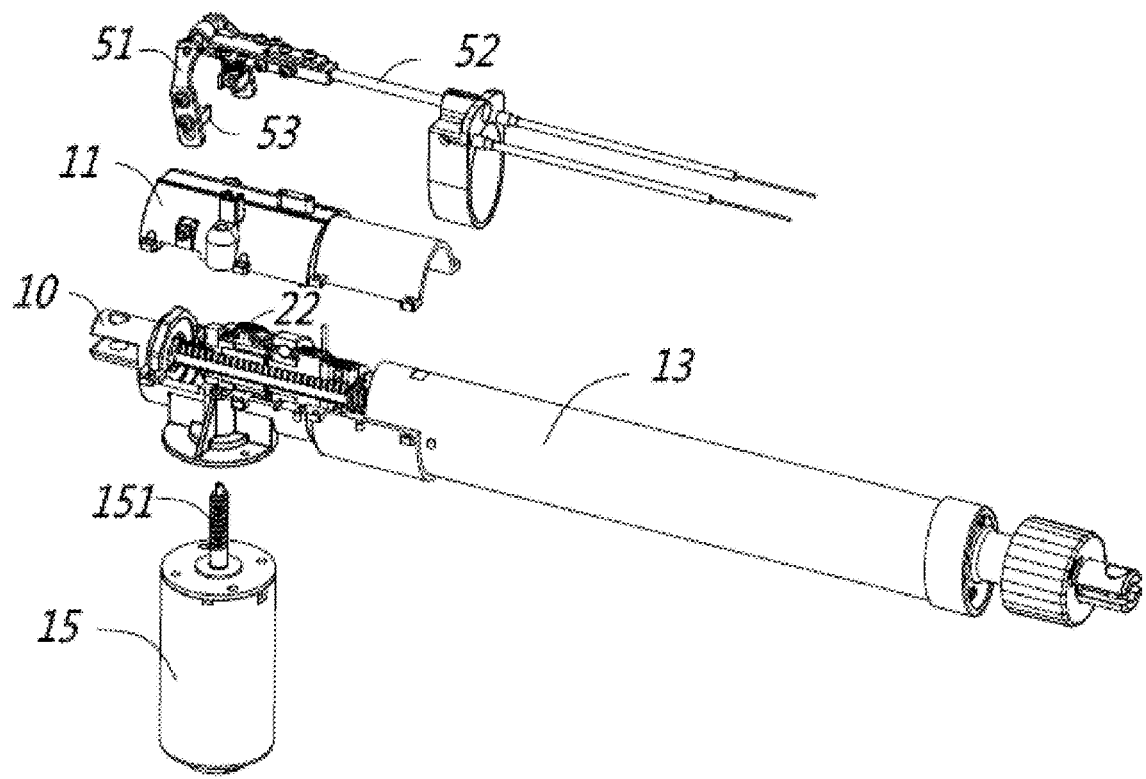
FIG. 3 is an exploded schematic diagram of the linear actuator according to the embodiment 1 of the present disclosure.

When the linear actuator needs to quickly retract after extending to the predetermined position, this embodiment may unlock the self-locking device to be quickly released. In this embodiment, unlocking is mainly achieved by the second driving member, with a specific structure as follows: as shown in FIG. 2 to FIG. 4, the second driving member includes a push block 54. The push block 54 is provided with a guide surface 541. The release torsion spring 40 includes a pin 401 that extends radially. In this embodiment, the pin 401 extends from the top of the shell. The guide surface 541 is arranged on a side surface of the push block 54. The push block 54 is fixedly connected with the pull rod 52, that is, in this embodiment, the self-locking device and the clutch device share one pull rod 52. When the pull rod 52 is pulled, the guide surface 541 on the push block 54 is in contact with the pin 401, thereby making the release torsion spring 40 extend outwards. When the release torsion spring 40 extends outwards, the resistance between the release torsion spring 40 and the second friction sleeve 42 will be reduced accordingly. In this state, when the end surfaces of the first friction sleeve 41 and the second friction sleeve 42 contact each other, the second friction sleeve 42 will rotate synchronously with the first friction sleeve 41, so that the first friction sleeve 41 will not generate resistance to the rotary screw 20, and the rotary screw 20 has no resistance. At this time, in a state that the clutch device cuts off the connection and the self-locking device is also unlocked, the rotary screw 20 is basically in a free idling state, and the transmission nut 21 may be quickly retracted.

In addition, in this embodiment, the guide surface 541 is configured to gradually push the release torsion spring 40 to gradually reduce the self-locking force, so that the self-locking force will not disappear immediately, and a stepless adjustment is achieved.

To better optimize operation of the clutch device and the self-locking device, in this embodiment, an operation sequence of the clutch device and the self-locking device is optimized. As shown in FIG. 2, the pull rod 52 is provided with a waist-shaped hole for adjustment, and the push block 54 is fixed on the waist-shaped hole by a tightening screw. The waist-shaped hole is mainly configured to adjust an initial position of the push block 54. There are two purposes for setting the initial position. One is to compensate for some actual assembly errors to make the push block 54 more accurately contact the release torsion spring 40, and the other is to, as mentioned in this text, adjust the operation sequence of the self-locking device and the clutch device. As shown in FIG. 2, in the initial state, the guide surface 541 of the push block 54 needs to move a certain stroke before it contacts with the pin 401 of the release torsion spring 40. During this stroke, it may be understood as an idle stroke of the push block 54. During this idle stroke, the clutch device operates normally, so that the coupling gear sleeve 31 will be poked first. Meanwhile, during the resetting, the self-locking device is self-locked first, and then the clutch device connects the power, so that the rotational speed of the rotary screw 20 will be reduced after the self-locking device generates the self-locking force, the coupling gear sleeve 31 and the transmission worm wheel 22 will not be damaged when the coupling gear sleeve 31 is engaged with the transmission worm wheel 22, and the service life may be greatly prolonged.

In addition, to enable the user to better perceive a release range, in this embodiment, toothed bars 521 are arranged on the pull rod 52, and movable latches 522 are arranged on the shell. The movable latches 522 are connected with a spring. When the pull rod 52 is pulled, the movable latches 522 are clipped into the toothed bars 521 one by one. A pull stroke of the pull rod 52 may be perceived by using the positions of the movable latches 522 in the toothed bars 521.

It should be noted that the structures of the self-locking device and the clutch device are not limited to the structures shown in this embodiment. The self-locking device, taken as an example, may only include a single third friction sleeve. The third friction sleeve rotates synchronously with the rotary screw. The release torsion spring is sleeved on the third friction sleeve. In the initial state, the release torsion spring holds the third friction sleeve tightly to generate resistance to the rotary screw, equivalently, the release torsion spring serves as the self-locking torsion spring. After the release torsion spring is pushed by the push block, the resistance of the release torsion spring to the third friction sleeve disappears. The clutch device, taken as an example, may be realized by a combination of other splined sleeves 34 and splines. For this, an embodiment 2 below also shows different implementations of the self-locking device and the clutch device.

Figure 6:
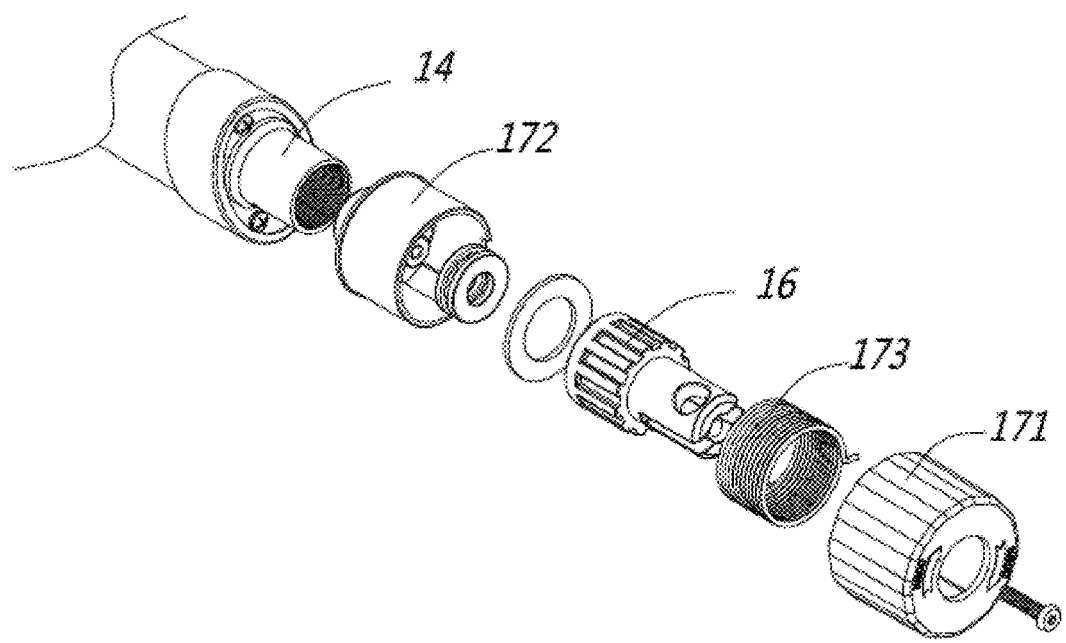
FIG. 6 is an exploded schematic diagram of a hand-screw release device in the linear actuator according to the embodiment 1 of the present disclosure.
Figure 7:
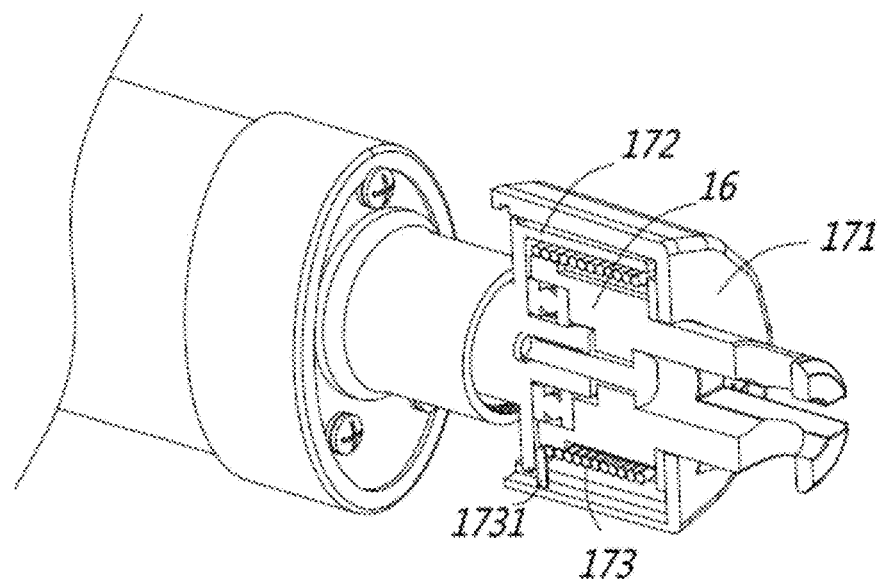
FIG. 7 is a schematic cross-sectional view of the hand-screw release device in the linear actuator according to the embodiment 1 of the present disclosure.

As shown in FIGS. 6-7, to further improve the release function of the linear actuator, in the linear actuator provided by this embodiment, an end of the inner tube 14 is connected with a front pull head 16, and a hand-screw release device 17 is connected between the front pull head 16 and the end of the inner tube 14. The power between the front pull head 16 and the inner tube 14 may be disconnected by using the hand-screw release device 17.

Specifically, the hand-screw release device 17 includes a knob cover 171, a connection cover seat 172 and a hand-screw release torsion spring 173. The connection cover seat 172 is fixedly connected with the inner tube 14. The front pull head 16 is sleeved with the connection cover seat 172. The hand-screw release torsion spring 173 is arranged between the connection cover seat 172 and the front pull head 16. Specifically, the hand-screw release torsion spring 173 is sleeved outside the front pull head 16, while the hand-screw release torsion spring 173 also has a corresponding pin 1731. The pin 401 penetrates through a gap in the connection cover seat 172 and abuts with the knob cover 171. The knob cover 171 is turned to poke the hand-screw release torsion spring 173 to radially retract or radially extend outwards, so as to control frictional resistance of the hand-screw release torsion spring 173 to the front pull head 16.

In addition, this embodiment also optimizes an installation structure of the clutch device. Referring to FIG. 4, when the inner tube 14 of the linear actuator extends to the predetermined position and tends to retract, the rotary screw 20 will be subjected to an axial force. After the rotary screw 20 is subjected to the axial force, the axial force will be transmitted to the first friction sleeve 41. The first friction sleeve 41 will transmit the axial force to the second friction sleeve 42. A second bearing 44 is sleeved on the second friction sleeve 42, and meanwhile, the second bearing 44 and a limit step 111 on the shell are axially limited, so the axial force is directly transmitted to the shell by the second bearing 44 on the second friction sleeve 42.

Therefore, in this embodiment, the first friction sleeve 41, the second friction sleeve 42, and the second bearing 44 substantially constitute an axial limit sleeve part, and the rotary screw 20 directly transmits the axial force to the shell by the axial limit sleeve part. Since the entire clutch device is located at a rear end of the limit step 111 of the shell, the clutch device is not subjected to the axial force during the entire transmission process of the axial force. Under such circumstance, it is more effort-saving for the user to poke the coupling gear sleeve in the clutch device by using the first driving member. Meanwhile, since the clutch device is not subjected to the axial force from the rotary screw 20, the service life of the clutch device may be greatly prolonged.

Embodiment 2

As shown in FIG. 8 to FIG. 11, this embodiment is similar to the embodiment 1 in general operation principle, and a main difference lies in specific structures of a self-locking device, a clutch device, a first driving member, and a second driving member.

According to a self-locking device in this embodiment: in the embodiment 1, the first friction sleeve 41 and the second friction sleeve 42 are axially arranged side by side, and outer end surfaces of the first friction sleeve 41 and the second friction sleeve 42 contact each other, while in this embodiment, a second friction sleeve 42 is sleeved outside a first friction sleeve 41, and an outer end surface of the first friction sleeve 41 is in contact with an inner end surface of the second friction sleeve 42. This embodiment is the same as the embodiment 1 in installation between the first friction sleeve 41 and a rotary screw 20, the first friction sleeve 41 still rotates synchronously with the rotary screw 20, a self-locking torsion spring 43 is also sleeved outside the first friction sleeve 41, and a release torsion spring 40 is still sleeved outside the second friction sleeve 42. This embodiment is similar to the embodiment I in work principle, that is, a self-locking force of the self-locking torsion spring 43 mainly comes from a frictional force of end surfaces of the first friction sleeve 41 and the second friction sleeve 42.

In this embodiment, the first friction sleeve 41 is similar in structure to the first friction sleeve in the embodiment 1, and also includes a front shaft sleeve 411 and a rear shaft sleeve 412. A thrust bearing is arranged between the front shaft sleeve 411 and the rear shaft sleeve 412. The self-locking torsion spring 43 is simultaneously sleeved outside the front shaft sleeve 411 and the rear shaft sleeve 412. The rear shaft sleeve 412 is in contact with the inner end surface of the second friction sleeve 42.

The advantage of this self-locking device is that an installation space is smaller, and mainly an axial space will be smaller, which is beneficial to reduce the size of the entire linear actuator.

According to a clutch device in this embodiment: the clutch device in this embodiment further includes a splined sleeve 34. The splined sleeve 34 is located between the rotary screw 20 and a coupling gear sleeve 31. The splined sleeve 34 rotates synchronously with the rotary screw 20. A torque is transmitted by mainly a flat position between the splined sleeve 34 and the rotary screw 20. The coupling gear sleeve 31 and a transmission worm wheel 22 always keep synchronous rotation. A first driving member mainly pushes the coupling gear sleeve 31 and the splined sleeve 34 to be engaged or disengaged.

In this embodiment, the first driving member is slightly different from the first driving member in the embodiment 1. A poke block 55 is used. The poke block 55 is rotatably connected with a pull rod 52. When the pull rod 52 is pulled, the poke block 55 pokes the coupling gear sleeve 31 to move axially.

Figure 8:
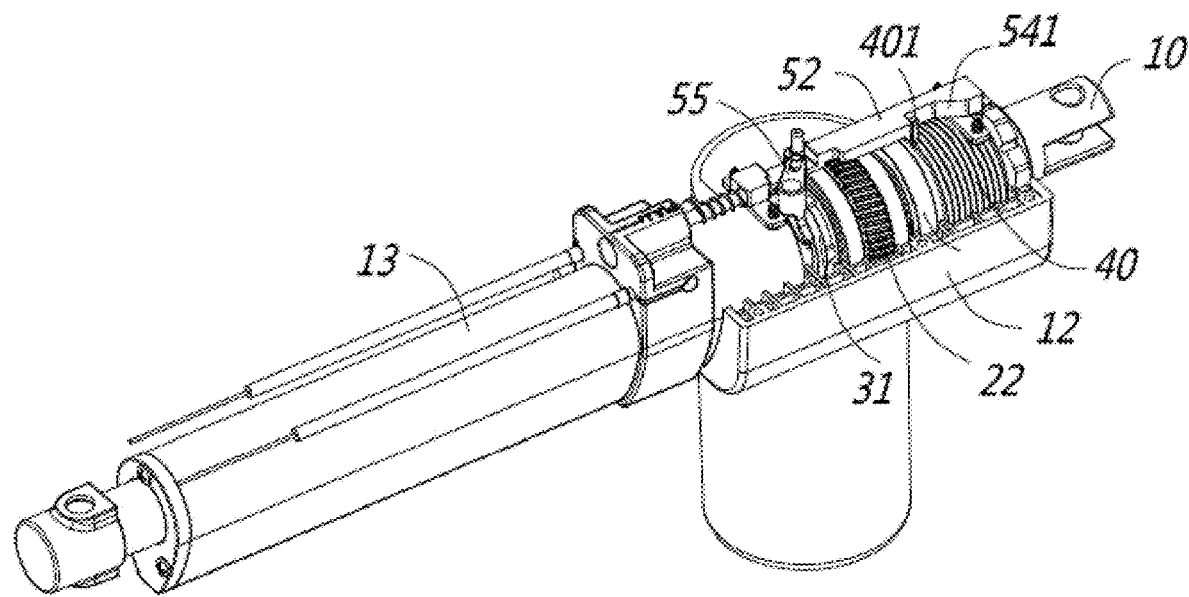
FIG. 8 is a schematic structural diagram of a linear actuator according to an embodiment 2 of the present disclosure.
Figure 9:
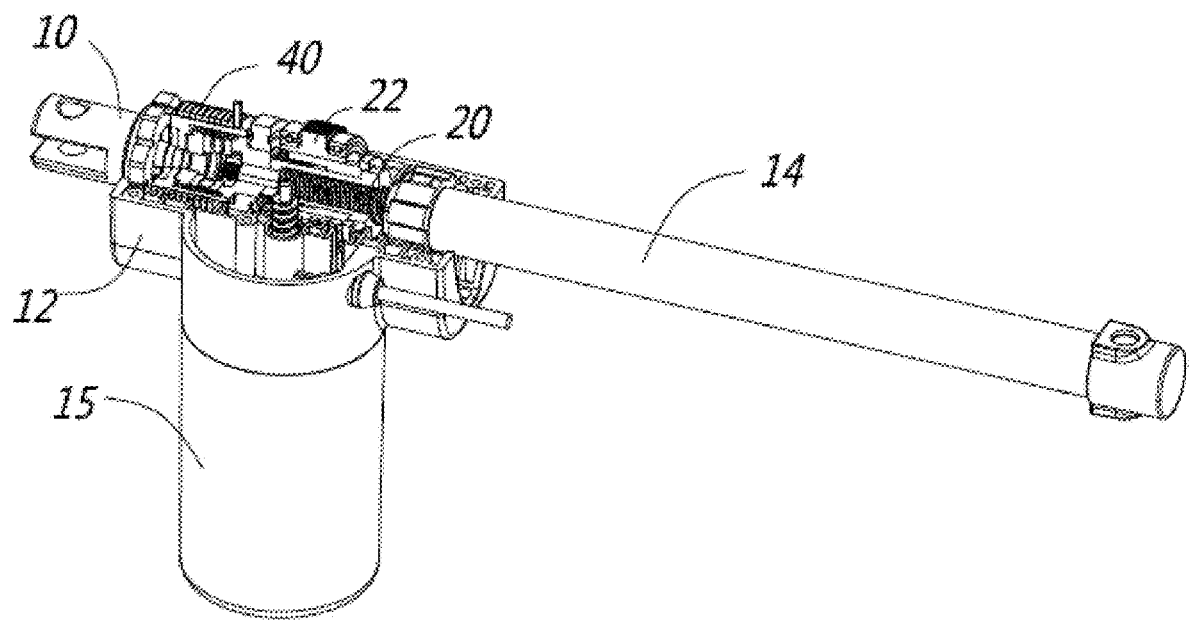
FIG. 9 is a partial cutaway schematic diagram of the linear actuator according to the embodiment 2 of the present disclosure.
Figure 10:
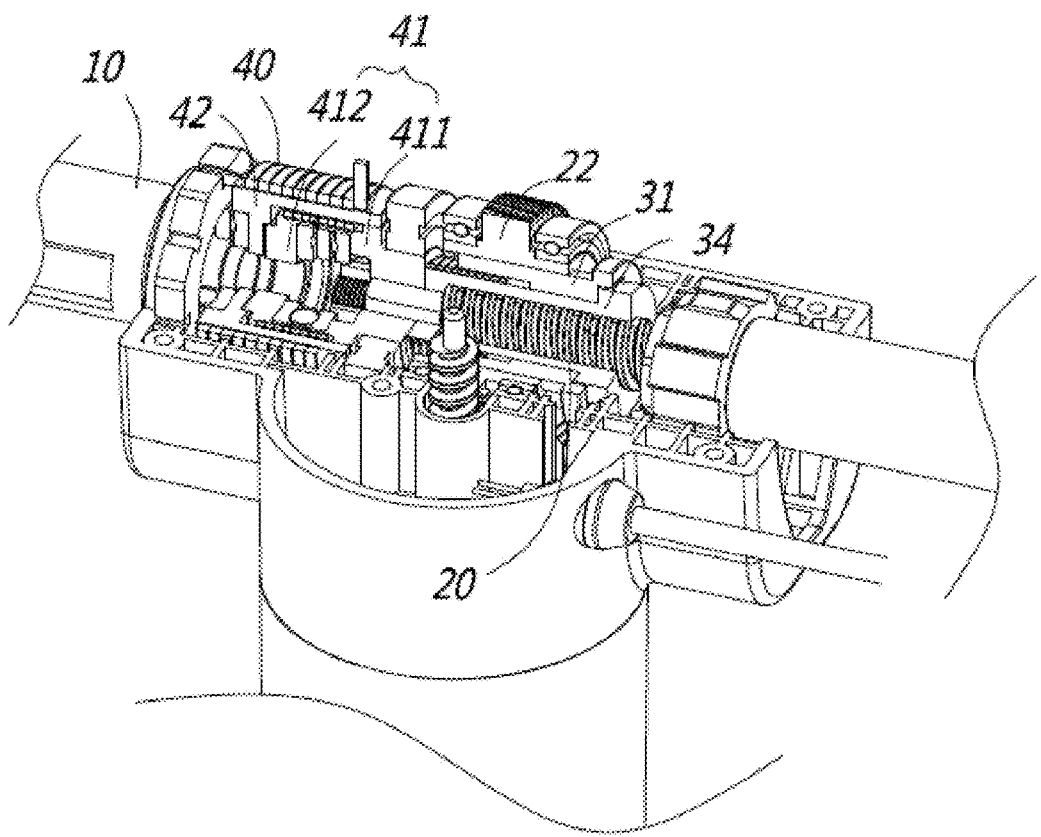
FIG. 10 is a partial cutaway and enlarged schematic diagram of the linear actuator according to the embodiment 2 of the present disclosure.
Figure 11:
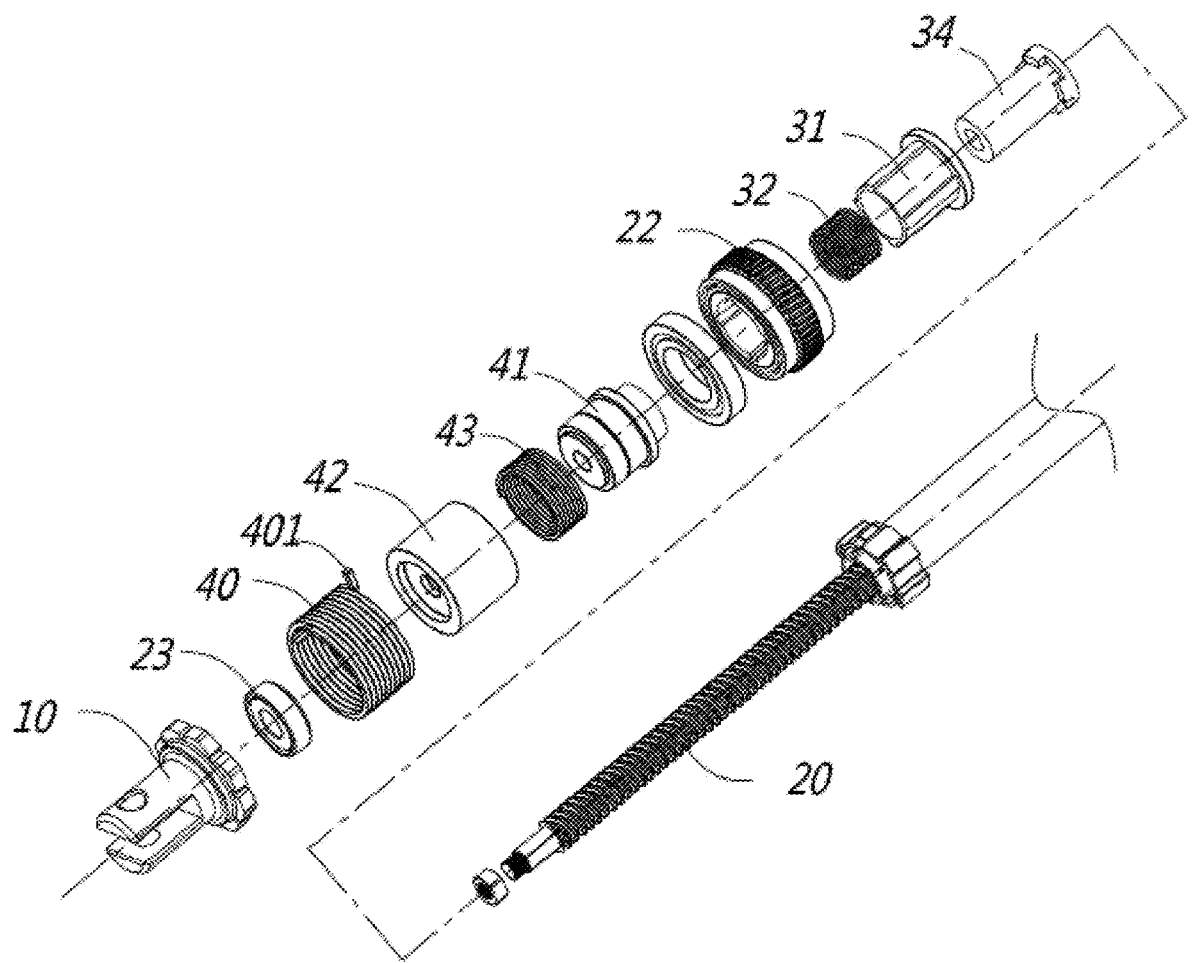
FIG. 11 is an exploded schematic diagram of internal parts in the linear actuator according to the embodiment 2 of the present disclosure.

In this embodiment, a second driving member is directly integrated with the pull rod 52, as shown in FIG. 8, and a guide surface 541 is arranged on the pull rod 52.

In addition, compared with the embodiment 1, this embodiment cancels a hand-screw release device 17.

The clutch device in this embodiment is the same as the clutch device in the embodiment 1, and the coupling gear sleeve is not subjected to an axial force from the rotary screw 20. The transmission of the axial force in this embodiment is as follows:

When an inner tube 14 of a linear actuator extends to a predetermined position and tends to retract, the rotary screw 20 will be subjected to the axial force, and the splined sleeve 34 is in contact with a shaft shoulder of the rotary screw 20, so the axial force of the rotary screw 20 is transmitted to the splined sleeve 34 in first time. An end surface of the splined sleeve 34 is in contact with an end surface of the first friction sleeve 41, that is, the splined sleeve 34 and the first friction sleeve 41 are axially limited, so the axial force will be transmitted to the first friction sleeve 41. A tail end surface of the first friction sleeve 41 is in contact with the inner end surface of the second friction sleeve 42, so the axial force will be transmitted to the second friction sleeve 42. A tapered roller bearing 23 is arranged between a tail end surface of the second friction sleeve 42 and a tail pull head 10, so the axial force is finally transmitted to the tail pull head 10 by the tapered roller bearing 23.

In this embodiment, the splined sleeve 34, the first friction sleeve 41, and the second friction sleeve 42 together constitute an axial limit sleeve part, and the rotary screw 20 transmits the axial force to the tail pull head 10 by the axial limit sleeve part. From the perspective of the entire transmission process of the axial force, the coupling gear sleeve in this embodiment will never be subjected to the axial force, so it is also effort-saving for poking the coupling gear shaft by the first driving member.

The above are merely the specific embodiments of the present disclosure, but the scope of protection of the present disclosure is not limited thereto. Those skilled in the art should understand that the present disclosure includes but is not limited to the content described in the accompanying drawings and the above specific embodiments. Any modification that does not depart from the functional and structural principles of the present disclosure will be included within the scope of the claims.

What is claimed is:

1. A linear actuator, comprising a drive motor, a transmission assembly, a rotary screw and a transmission nut, wherein the drive motor drives the rotary screw to rotate by the transmission assembly, and the rotary screw rotates to drive the transmission nut to move axially along the rotary screw; wherein the linear actuator further comprises:
a clutch device, arranged between the transmission assembly and the rotary screw, and configured to connect or disconnect power between the transmission assembly and the rotary screw;
a self-locking device, configured to generate frictional resistance to the rotary screw when the rotary screw rotates reversely, and comprising a release torsion spring configured to unlock the self-locking device; and
a hand-pull release assembly, comprising a first driving member connected with the clutch device and a second driving member connected with the self-locking device, wherein the hand-pull release assembly has an initial state and a fully released state, when transitioning from the initial state to the fully released state, the first driving member is capable of driving the clutch device to disconnect the power, and the second driving member is capable of driving the release torsion spring to extend,
wherein, when transitioning from the fully released state to the initial state of the hand-pull release assembly, the second driving member is first disengaged from the release torsion spring on the self-locking device to generate a self-locking force, and the first driving member is correspondingly disengaged from the clutch device after the release torsion spring is returned.

2. The linear actuator according to claim 1, wherein the transmission assembly comprises a transmission worm and a transmission worm wheel, the transmission worm is connected with the drive motor, the transmission worm wheel is sleeved outside the rotary screw, and the clutch device is arranged between the transmission worm wheel and the rotary screw.

3. The linear actuator according to claim 2, wherein the clutch device comprises a coupling gear sleeve, the transmission worm wheel is provided with a gear slot matching for transmission with the coupling gear sleeve, and the coupling gear sleeve is sleeved on the rotary screw and is axially movable relative to the rotary screw.

4. The linear actuator according to claim 3, wherein the clutch device further comprises a return spring that generates an axial reset force to the coupling gear sleeve.

5. The linear actuator according to claim 1, further comprising a shell, wherein the first driving member comprises a swing rod rotatably installed on the shell, the hand-pull release assembly further comprises a pull rod arranged to be axially movable relative to the rotary screw, the swing rod is connected with the pull rod, and when the pull rod is pulled, the swing rod swings to push the clutch device axially.

6. The linear actuator according to claim 1, wherein the self-locking device comprises a first friction sleeve and a second friction sleeve that are respectively sleeved on the rotary screw and have axial end surfaces contacting each other, the first friction sleeve rotates synchronously with the rotary screw, the second friction sleeve freely rotates relative to the rotary screw, the first friction sleeve is sleeved with a self-locking torsion spring, and the release torsion spring is sleeved on the second friction sleeve; or
the self-locking device comprises a third friction sleeve that rotates synchronously with the rotary screw, and the release torsion spring is sleeved on the third friction sleeve.

7. The linear actuator according to claim 1, wherein the second driving member comprises a push block that is provided with a guide surface, the release torsion spring comprises a pin that extends radially, the hand-pull release assembly comprises a pull rod arranged to be axially movable relative to the rotary screw, the pull rod is connected with the push block, and when the pull rod is pulled, the guide surface on the push block is in contact with the pin, thereby making the release torsion spring extend outwards.

8. The linear actuator according to claim 1, further comprising an outer tube and an inner tube that is telescopic relative to the outer tube, wherein an end of the inner tube is connected with a front pull head, and a hand-screw release device is connected between the front pull head and the end of the inner tube.

9. The linear actuator according to claim 8, wherein the hand-screw release device comprises a knob cover, a connection cover seat and a hand-screw release torsion spring, the connection cover seat is fixedly connected with the inner tube, the front pull head is sleeved with the connection cover seat, the hand-screw release torsion spring is arranged between the connection cover seat and the front pull head, and the knob cover is configured to poke the hand-screw release torsion spring to radially retract or radially extend outwards.

* * * * *